D. J. LOVE.
STANCHION.
APPLICATION FILED JAN. 15, 1915.
1,154,706.
Patented Sept. 28, 1915.
2 SHEETS—SHEET 1.
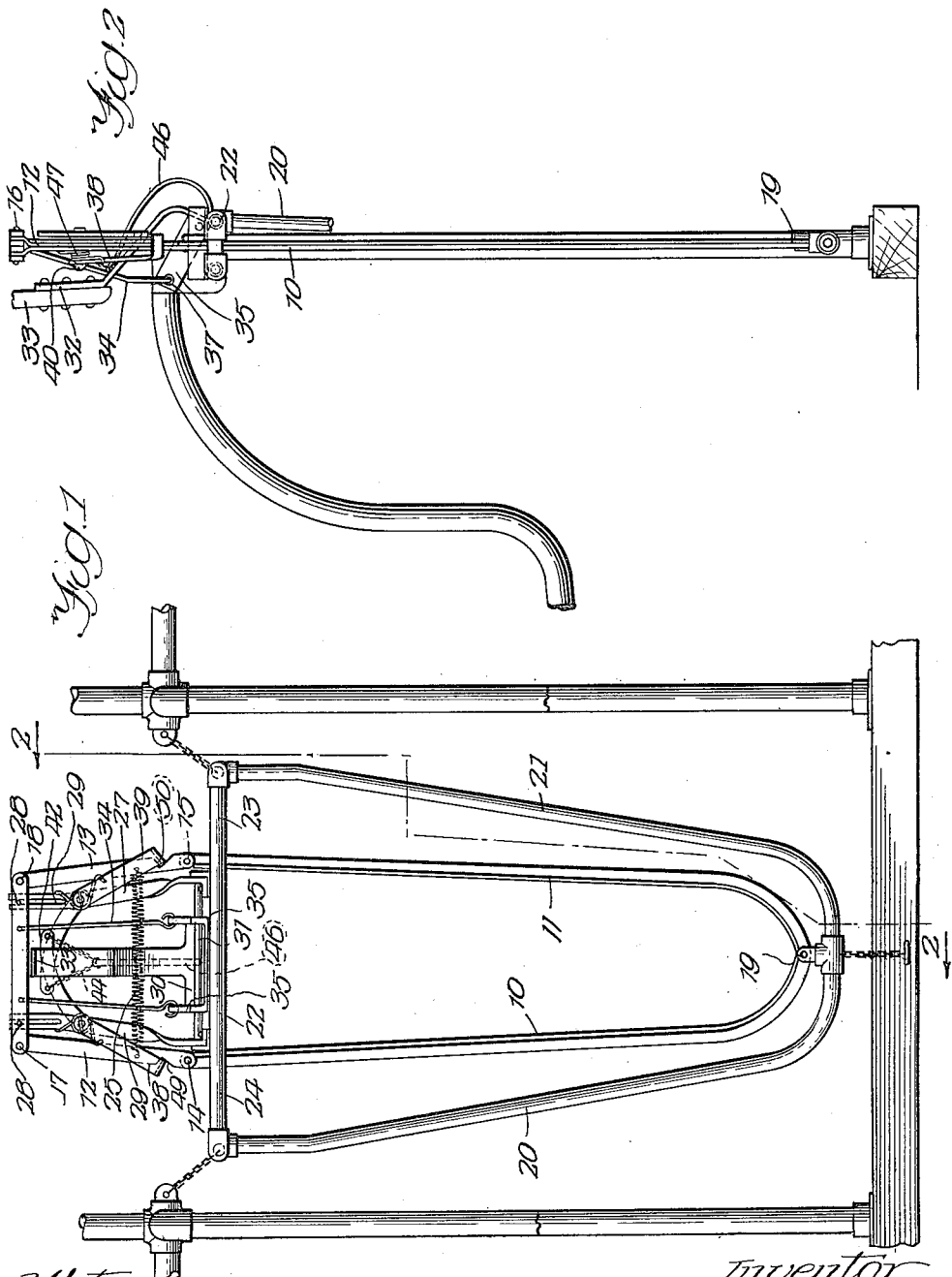
Witnesses
G. A. Barrett.
R. N. Long.
Inventor
Daniel J. Love
By Wilfred C. Lane. Atty.

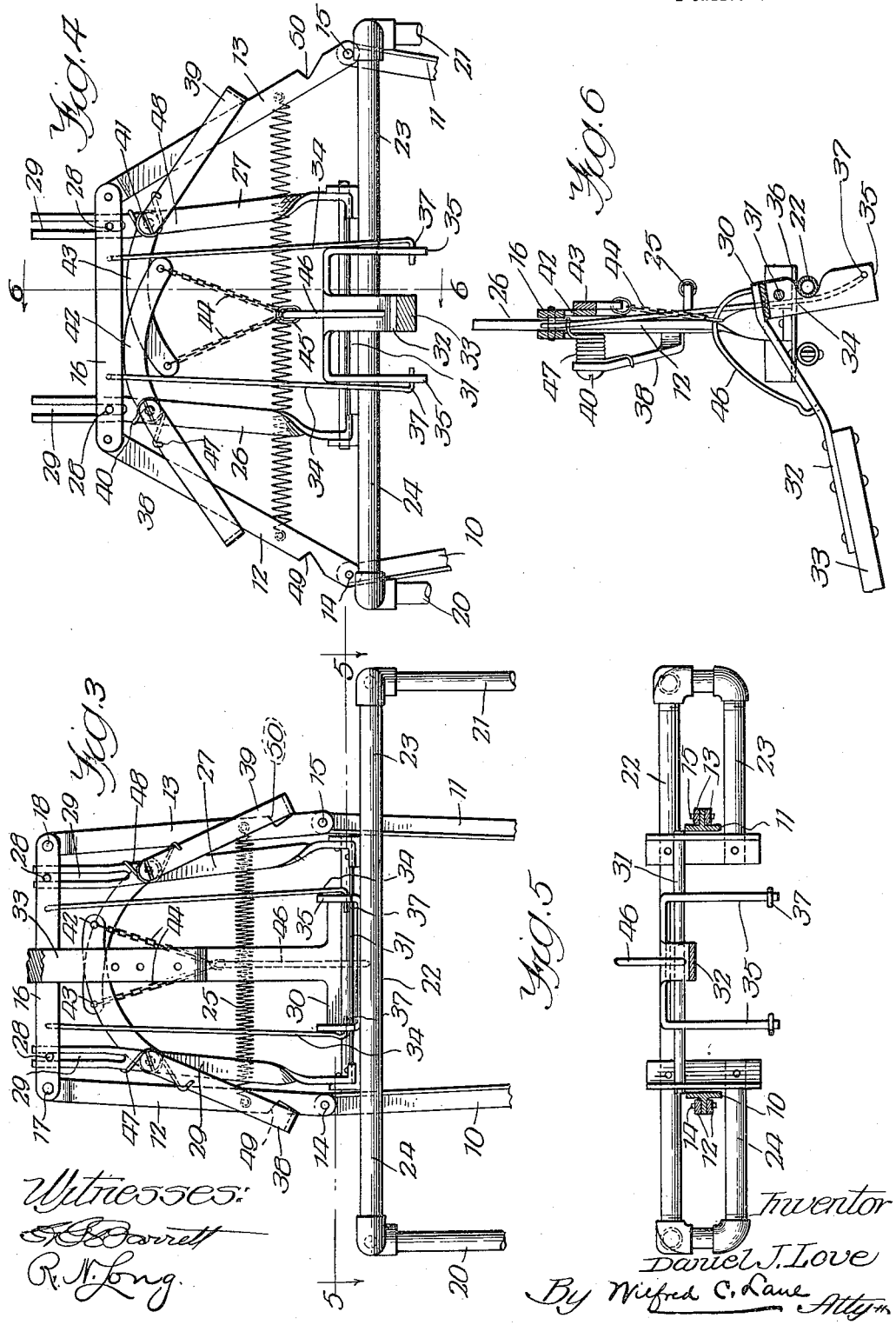

UNITED STATES PATENT OFFICE.

DANIEL J. LOVE, OF CARLISLE, IOWA.

STANCHION.

1,154,706.

Specification of Letters Patent.   Patented Sept. 28, 1915.

Application filed January 15, 1915.   Serial No. 2,325.

*To all whom it may concern:*

Be it known that I, DANIEL J. LOVE, a citizen of the United States, residing at Carlisle, in the county of Warren and State of Iowa, have invented certain new and useful Improvements in Stanchions, of which the following is a specification.

This invention relates to improvements in cattle stanchions, having means for automatically closing and locking the same, after the animal has passed its head therethrough.

A further object is to provide an improved stanchion having means for first rendering the said locking means inactive, and subsequently opening the stanchion, and also means for maintaining the stanchion open.

To the attainment of these ends and the accomplishment of other new and useful objects as will appear, the invention consists in the features of novelty in substantially the construction, combination and arrangement of the several parts, hereinafter more fully described, and claimed and shown in the accompanying drawings, illustrating the invention, and in which—

Figure 1 is a front elevation of an improved device of this characted constructed in accordance with the principles of this invention, and showing the stanchion closed. Fig. 2 is a vertical sectional view on line 2—2, Fig. 1. Fig. 3 is an enlarged detail view of the operating mechanism for the stanchion, and with the parts in the positions they will assume when the stanchion is closed. Fig. 4 is a view similar to Fig. 1 showing the position of the parts when the stanchion is open. Fig. 5 is a sectional view on line 5—5, Fig. 3. Fig. 6 is a sectional view on line 6—6, Fig. 4.

Referring more particularly to the drawing, and in the present exemplification of this invention, the numerals 10 and 11 designate generally the uprights of the stanchion and these uprights have respectively connected thereto members 12, 13, by means of pivote 14, 15, and the free extremities of these members 12, 13 are connected by means of a cross bar or member 16, pivotally connected thereto as at 17, 18. The members 10 and 11 are pivotally connected at their lower extremities as at 19 and guards 20, 21 may be provided for the stanchion members. Supported by these guards is a cross bar 22, coöperating with which are arms 23, 24 to form guide ways for the members 10 and 11 when the stanchion is open or closed. This guard may be supported in position in any suitable manner and an elastic member 25, preferably in the form of a coil spring is provided and is secured to the members 12, 13, to extend thereacross, and this elastic member tends normally to move the members 12, 13 and consequently, the members 10 and 11 toward each other to close the stanchion.

Uprights 26, 27 are provided with which the cross member 16 has a sliding connection, preferably by means of the pin and slot connections 28, 29, and a crank device designated generally by the reference numeral 30 is pivotally supported as at 31 between the uprights of the stanchion, and is provided with an arm 32, which latter if desired, may have secured thereto an extension 33, adapted to extend between the uprights 10 and 11 and in such a position that when the stanchion is maintained open, this extension 33 will be in a position to be engaged and actuated by the head of the animal when its head passes between the stanchion members. This crank device 30 is connected by means of one or more bars or rods 34 with the cross bar member 15 so that when the device 30 is rocked in one direction about its pivot, the member 16 will be drawn downwardly upon the supports 26, 27 to separate the stanchion member against the stress of the elastic member 25, and the members 34 are so constructed and the arm 35 of the crank member 30 is notched as at 36 so that when the points of connection 37 of the crank device 30 pass beyond the center of the pivot 31 of the crank device, the member 16 will be maintained in a lowered position, and the stanchion members will be held separated against the stress of the elastic member 25.

As soon as the crank device is moved in the opposite direction by the animal or otherwise, and the point of connection 37 of the members 34 with the arm 35 pass to the other side of the center of the pivot, the elastic member 25 will draw the stanchion members together and elevate the cross member 16. In order to maintain the stanchion member maintained locked against separation, pivoted catches 38, 39 may be provided which are mounted as at 40, 41 respectively upon the uprights 26, 27, and these catches are provided with arms 42, 43, with which flexible members 44 are connected and these flexible members may terminate in a ring or eye 45 through which a guide 46 on the crank device 30 freely passes. Elastic members 47, 48 are provided which tend normally to hold the free ends of the catches 38, 39 respectively against the members 12, 13, and which latter are respectively provided with notches 49, 50, into which the catches pass when the stanchions are closed.

When the crank device 30 is lowered to swing about its pivot 31, the first operation will be to draw upon the flexible members 44, to lock the catches 38, 39 about their pivots and against the stress of the elastic members 47, 48, to unlock the stanchion members. A further movement of the crank device in the same direction will cause the cross bar or member 16 to be lowered by the elements 34 and this will force the stanchion members apart, until the point of connection 37 of the members 34 will pass beyond the center of the pivot, and at which time the stanchion members will be maintained open.

As soon as the animal rocks the crank device in the opposite direction sufficiently, the stanchion members will be drawn together, and the member 16 elevated until the catches 38, 39 enter the respective notches 49, 50 of the members 12, 13.

While the preferred form of the invention has been herein shown and described, it is to be understood that numerous changes may be made in the details of construction and in the combination and arrangement of the several parts without departing from the spirit of this invention, and while only one stanchion is shown, it is to be understood that any number of these devices may be arranged adjacent to each other.

What is claimed as new is:

1. In a cattle stanchion the combination of two uprights pivotally connected at one end, each of said uprights comprising jointed members, the upper ends of which members are spaced, a member extending across the said space and pivotally connected with the upright members, means tending normally to move the uprights in a direction toward each other, a guide for the cross member, means for moving the cross member with respect to the guide and the said uprights to move the latter away from each other and against the stress of the first recited means, and means operating automatically to lock the uprights against separation.

2. In a cattle stanchion the combination of two uprights pivotally connected at one end, each of said uprights comprising jointed members, the upper ends of which members are spaced, a member extending across the said space and pivotally connected with the upright members, means tending normally to move the uprights in a direction toward each other, a guide for the cross member, means for moving the cross member with respect to the guide and the said uprights to move the latter away from each other and against the stress of the first recited means, guides for the uprights, and means operating automatically to lock the uprights against separation.

3. In a cattle stanchion the combination of two uprights pivotally connected at one end, each of said uprights comprising jointed members, the upper ends of which members are spaced, a member extending across said space and pivotally connected with the upright members, means tending normally to move the uprights in a direction toward each other, a guide for the cross member, means for moving the cross member with respect to the guide and the said uprights to move the latter away from each other and against the stress of the first recited means, the second recited means embodying an arm projecting between the uprights to be shifted by the animal, and means operating automatically to lock the uprights against separation.

4. A cattle stanchion embodying two uprights movable toward and from each other, each of said uprights comprising spaced jointed members, means tending normally to move the members toward each other, a member pivotally connected with portions of the said uprights and operating when moved in one direction with respect to the uprights to separate them against the stress of the said means, and means for actuating the last recited member, the last recited means embodying provisions for maintaining the last recited member in a position to maintain the uprights separated.

5. A cattle stanchion embodying two uprights movable toward and from each other, each of said uprights comprising spaced jointed members, means tending normally to move the members toward each other, a member pivotally connected with portions of the said uprights and operating when moved in one direction with respect to the uprights to separate them against the stress of the said means, and means for actuating the last recited member, the last recited means embodying provisions for maintaining the last recited member in a position to maintain the uprights separated, and also embodying a portion adapted to be positioned to be shifted by the animal.

6. A cattle stanchion embodying two uprights movable toward and from each other, each of said uprights comprising spaced jointed members, means tending normally to move the members toward each other, a member pivotally connected with portions of the said uprights and operating when moved in one direction with respect to the uprights to separate them against the stress of the said means, means for automatically locking the said uprights against separation, and actuating means operatively connected with the last recited member, and to the action of which actuating means, the said locking means is responsive to release the uprights.

7. A cattle stanchion embodying two uprights movable toward and from each other, each of said uprights comprising spaced jointed members, means tending normally to move the members toward each other, a member pivotally connected with portions of the said uprights and operating when moved in one direction with respect to the uprights to separate them against the stress of the said means, means for actuating the last recited member, the last recited means embodying provisions for maintaining the last recited member in a position to maintain the uprights separated, and means operating automatically to lock the uprights against separation.

8. A cattle stanchion embodying spaced jointed uprights, means tending normally to move the uprights toward each other, means having a pivotal connection with the uprights for separating them, a pivotally mounted actuating element disposed between the uprights, and an operative connection between the second said means and the actuating element, the said connection embodying an element shaped to hold the second recited means in a position to maintain the uprights separated against the stress of the first recited means when the point of connection of the second said element with the actuating element passes to one side of the center of the pivot of the said actuating element.

9. A cattle stanchion embodying spaced jointed uprights, means tending normally to move the uprights toward each other, means having a pivotal connection with the uprights for separating them, a pivotally mounted actuating element disposed between the uprights, an operative connection between the second said means and the actuating element, the said connection embodying an element shaped to hold the second recited means in a position to maintain the uprights separated against the stress of the first recited means when the point of connection of the second said element with the actuating element passes to one side of the center of the pivot of the said actuating element, locking means for holding the uprights against separation, and means embodying the said actuating element for rendering the said locking means inactive.

10. A cattle stanchion embodying spaced jointed uprights, means tending normally to move the uprights toward each other, means having a pivotal connection with the uprights for separating them, a pivotally mounted actuating element disposed between the uprights, an operative connection between the second said means and the actuating element, the said connection embodying an element shaped to hold the second recited means in a position to maintain the uprights separated against the stress of the first recited means when the point of connection of the second said element with the actuating element passes to one side of the center of the pivot of the said actuating element, locking means for holding the uprights against separation, and an operative connection between the actuating element and the said locking means for rendering the latter inactive.

11. A cattle stanchion embodying spaced uprights pivotally movable with respect to each other and each comprising jointed members, a slide connected with the uprights and movable in one direction to separate the uprights, yielding means tending to move the uprights toward each other, a crank device pivotally supported between the uprights, and a connecting rod between the crank device and the said slide and shaped to permit its point of connection with the crank to pass to one side of the center of the pivot of the latter to hold the slide in a position to maintain the uprights separated against the stress of the said yielding means.

12. A cattle stanchion embodying spaced uprights pivotally movable with respect to each other and each comprising jointed members, a slide connected with the uprights and movable in one direction to separate the uprights, yielding means tending to move the uprights toward each other, a crank device pivotally supported between the uprights, a connecting rod between the crank device and the said slide and shaped to permit its point of connection with the crank to pass to one side of the center of the pivot of the latter to hold the slide in a position to maintain the uprights separated against the stress of the said yielding means, and a catch operating automatically to maintain the uprights against separation.

13. A cattle stanchion embodying spaced uprights pivotally movable with respect to each other and each comprising jointed members, a slide connected with the uprights and movable in one direction to separate the uprights, yielding means tending to move the uprights toward each other, a crank device pivotally supported between the uprights, a connecting rod between the crank device and the said slide and shaped to permit its point of connection with the crank to pass to one side of the center of the pivot of the latter to hold the slide in a position to maintain the uprights separated against the stress of the said yielding means, and a catch operating automatically to maintain the uprights against separation, and an operative connection between the crank and the catch for rendering the latter inactive.

14. A cattle stanchion embodying spaced uprights pivotally movable with respect to each other and each comprising jointed members, a slide connected with the uprights and movable in one direction to separate the uprights, yielding means tending to move the uprights toward each other, a crank device pivotally supported between the uprights, a connecting rod between the crank device and the said slide and shaped to permit its point of connection with the crank to pass to one side of the center of the pivot of the latter to hold the slide in a position to maintain the uprights separated against the stress of the said yielding means, a catch for locking the uprights against separation, and means whereby the movement of the crank in one direction will render the catch inactive to release the said uprights in advance of the movement of the slide by the said crank.

In witness whereof, I hereunto subscribe my name to this specification in the presence of two witnesses.

DANIEL J. LOVE.

Witnesses:
L. O. HOWARD,
ANNA COOK.

Copies of this patent may be obtained for five cents each, by addressing the "Commissioner of Patents, Washington, D. C."